March 16, 1971 J. R. GILCHRIST ET AL 3,570,036
POLYURETHANE SPONGE SCRUBBER
Filed June 18, 1969

INVENTORS
James R. Gilchrist
Albert J. Assad
BY Sommer + Weber
ATTORNEYS

United States Patent Office 3,570,036
Patented Mar. 16, 1971

3,570,036
POLYURETHANE SPONGE SCRUBBER
James R. Gilchrist, Clarence, and Albert J. Assad, East Aurora, N.Y., assignors to Truly-Magic Products, Inc., Buffalo, N.Y.
Filed June 18, 1969, Ser. No. 834,411
Int. Cl. A47k 7/03
U.S. Cl. 15—104.94                             10 Claims

ABSTRACT OF THE DISCLOSURE

A scrubber in the form of a block of polyurethane sponge of intercommunicating open pore structure including at one surface, spaced elongated regions of such block which are rigidified compared to intermediate surface regions of such block which are not and hence are more resilient, thereby providing an effective scrubbing face, the block preferably being impregnated with a cleaning preparation containing an antibacterial agent to provide a surgical scrubber.

BACKGROUND OF THE INVENTION

The present invention relates to the field of articles manually used to scrub surfaces, and more particularly to a disposable surgical scrubber. Heretofore, surgical scrubbers have principally been brushes which in combination with a cleaning preparation such as soap or detergent containing an antibacterial agent were utilized to scrub the skin surfaces of the hands and forearms to sterilize the same. Such surgical scrubbing must effectively be performed over all the involved skin surface areas and must be accomplished in a way so as not to irritate the skin nor require an excessive length of time. While surgical scrubbers made of polyurethane sponge have been known, they have not been fully satisfactory principally because they did not have an effective scrubbing surface. The deficiencies of prior polyurethane sponge surgical scrubbers have been overcome by the construction of scrubber forming the subject matter of the present invention.

SUMMARY OF THE INVENTION

The scrubber of the present invention employs polyurethane sponge having intercommunicating open pores individually defined by differently oriented and interconnected frames across some of which walls extend. This allows the water releasable cleaning preparation such as soap or detergent containing the antibacterial agent to foam when the scrubber is wetted and squeezed as occurs during use of the sponge in scrubbing. The construction of the scrubber is such that a working face thereof has alternate elongated regions in which the pore structure is stiffer or more rigid as compared to adjacent more resilient portions of the pore structure, thereby providing surface bands of contrasting abrasiveness.

In accordance with the present invention, the scrubber comprises a polyurethane sponge pad covered on at least one side with a laminated layer of strips of polyurethane sponge joined together by adhesive which coats not only elements of the pore structures of such strips immediately at the opposing borders of adjacent strips, but also coats other elements of the pore structures of such strips more remote laterally of the joint provided between opposing borders of adjacent strips. Such coating, however, does not extend for the full width of any of such adjacent strips so that uncoated portions are more resilient than coated portions. The effect of such coating is to rigidify the pore structure. Inasmuch as the planes of the laminating joints are outstanding with respect to the covered side of the sponge pad or core section the rigidified portions for relatively stiff bands alternating with more resilient bands and the exposed sides of both such types of bands provide a working face for the scrubber.

The bonding of the aforementioned strips to each other and of the laminated layer to the pad is such that a barrier is not provided and the open pores of the various components of the scrubber intercommunicate. This permits the cleaning preparation impregnated in the pad from releasing outwardly when the scrubber is wetted and agitated to aerate or foam the cleansing preparation and allow it to move to the working face of the scrubber.

A further feature of the present invention is to construct the same so that it can be readily grasped and conveniently and effectively used.

Also, the construction which provides for the scrubber to be readily grasped also permits less abrasive surfaces of the scrubber to be employed to scrub sensitive skin areas in the case of the use of the scrubber as a surgical scrubber.

Other objects and advantages of the present invention will appear from the following detailed description of a preferred embodiment taken in conjunction with the accompanying drawing.

DESCRIPTION OF THE PREFERRED EMBODIMENT

Figure 1:
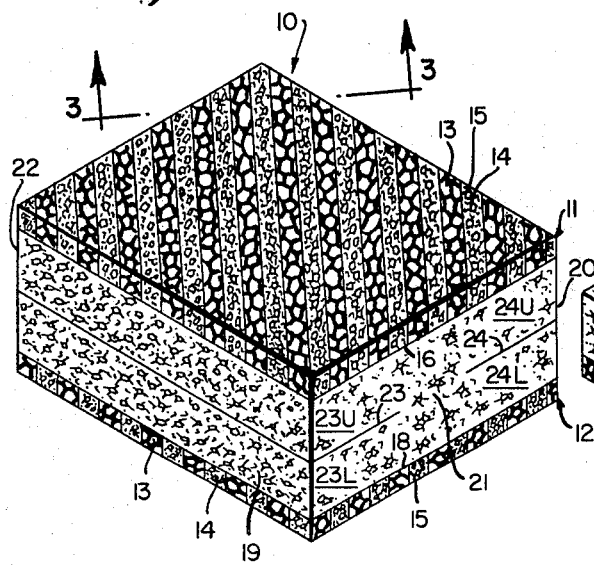
FIG. 1 is a perspective elevational view of a surgical scrubber constructed in accordance with the principles of the present invention.

The inventive scrubber is shown as comprising a polyurethane sponge pad represented generally by the numeral 10, and a laminated layer indicated generally by the numeral 11 on one side of pad 10, and a second similar laminated layer represented generally by the numeral 12 on the opposite side of the pad. Each of the laminated layers 11 and 12 includes a plurality of alternating strips of polyurethane sponge. One type of strip is represented by the numeral 13 and the second type of strip is represented by the numeral 14. The polyurethane sponge of which the pad 10 and each of the strips 13 and 14 are composed severally has intercommunicating open pores individually defined by differently oriented and interconnected frames across some of which walls extend.

Each adjacent pair of strips 13 and 14 is joined together to provide a laminating joint indicated typically at 15. The laminated layer 11 is joined to the upper flat surface of pad 10 by a planar joint represented by the numeral 16. The lower laminated layer 12 is joined to the lower flat surface of pad 10 by a planar joint indicated at 18.

Generally speaking, the various polyurethane sponge elements of the scrubber, including pad 10 and strips 13 and 14 in each of the layers 11 and 12 are joined together along the joints 15, 16 and 18 without blocking communication between the open pores of the various sponge elements. Pad 10 is shown as being in the form of a generally rectangular block of polyurethane sponge having upper and lower flat parallel sides which may be regarded as horizontal, a pair of flat parallel vertical sides 19 nd 20, and flat parallel vertical end surfaces 21 and 22. Laminated layers 11 and 12 cover the full area of the upper and lower sides of the intermediate pad 10.

Thus the scrubber as a whole is in the form of a rectangular block.

The scrubber is shown as partially slit horizontally along opposite vertical sides 19 and 20 for the full length thereof, such slit entering the pad 10 along the end faces 21 and 22 about one-third the distance of their horizontal width. One such slit is indicated at 23, this being the slit entering from vertical side face 19; and the other slit is indicated at 24, entering from the opposite vertical side face 20. These slits 23 and 24 are generally parallel to the upper and lower surfaces of pad 10.

Figure 2:
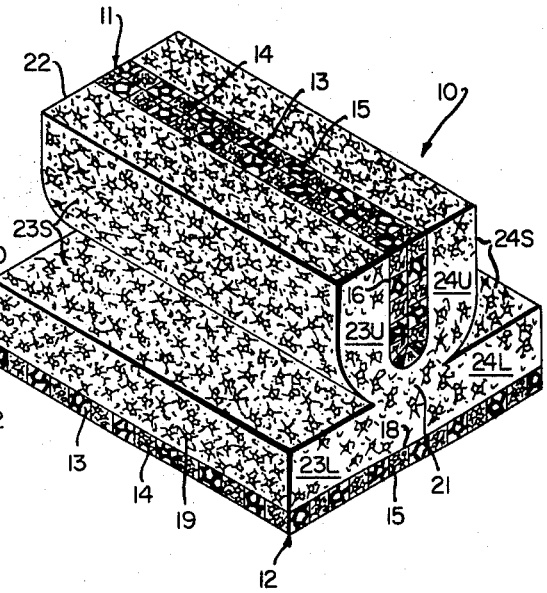
FIG. 2 is a similar perspective view of the surgical scrubber shown in FIG. 1, but illustrating the same as it might be grasped to provide a handle for the scrubber.

The portion of the scrubber above slit 23 is represented by the numeral 23U and the scrubber portion below this slit is represented by the numeral 23L. Similarly, the portion of the scrubber above slit 24 is represented by the numeral 24U and the portion below this slit by the numeral 24L. Referring to FIG. 2, it will be seen that the portions 23U and 24U may be folded upon themselves to stand upright to provide a handle which may be grasped by the user while the lower exposed surface of lower laminated layer 12 is used as a scrubbing face.

As previously indicated, the pad 10 and each of the strips 13 and 14 is composed of polyurethane sponge having intercommunicating open pores. It is an important feature of the present invention that the alternating strips 13 and 14 have two different pore sizes. One pore size falls in the range of from 15 to 35 pores per lineal inch, and the other pore size falls in the range of from 20 to 45 pores per lineal inch. Preferably, one such pore size is nominally 20 pores per lineal inch, which by convention allows a tolerance of plus or minus 5 pores per lineal inch; and the other pore size is nominally 30 pores per lineal inch, which again by convention allows a tolerance of plus or minus 5 pores per lineal inch. Preferably, pad 10 is nominally 30 pores per lineal inch.

The alternating strips 13 and 14 in each laminated layer 11 and 12 is shown as being of similar cross-sectional dimensions, preferably square, measured in a plane generally perpendicular to the vertical joints 15 extending between adjacent strips. The thickness of pad 10 is at least twice the sum of the thicknesses of laminated layers 11 and 12.

Adjacent strips 13 and 14 in each of the laminated layers 11 and 12 are joined together by a suitable adhesive which coats not only elements of the frames and walls of the polyurethane sponge immediately at the opposing borders of adjacent strips to provide a laminating joint therebetween, but also coats elements of the frames and walls of such strips laterally of the plane of such joint, but not for the full width of any of such adjacent strips.

Figure 3:
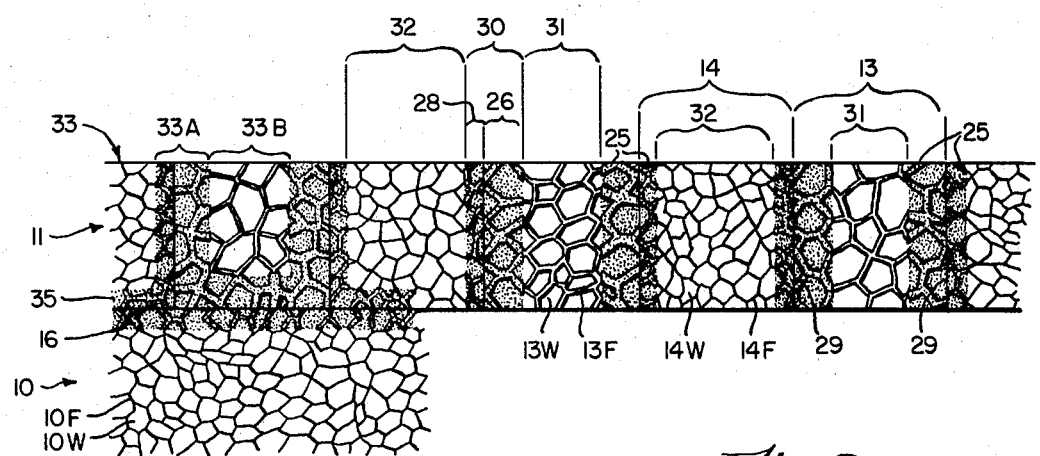
FIG. 3 is a greatly enlarged fragmentary cross-sectional view of the laminated layer and a portion of the pad shown in FIG. 1, this view being taken on line 3—3 of FIG. 1.

Thus, referring to FIG. 3, a strip 13 of larger pore size is shown as arranged between two intermediate strips 14 of smaller pore size. Adhesive of any suitable type represented by the numeral 25 is shown as coating the frame and wall structure for a marginal portion of each strip 13 for the full height thereof, such marginal portion being represented by the numeral 26.

Similarly, a marginal portion 28 of the adjacent strip 14 and for the full height of such strip is shown as coated by the adhesive 25. The frame and wall structure of each strip 13 and 14 is such as to include a multiplicity of polygonal rod-like frames, indicated typically at 13F in the case of strip 13 and 14F in the case of strip 14, oriented in different planes with membranous webs, indicated typically at 13W in the case of strip 13 and 14W in the case of strip 14, severally surrounded by some of such individual frames forming the walls of the pores. Portions of these frames and walls are coated by adhesive 25. The open pore structure immediately at the joining faces of adjacent strips 13 and 14 which provide a laminating joint 29 may be regarded as craters, the rims of which are coated with the adhesive as well as portions of the sub-surface frame and wall structure to which the adhesive is applied.

The pad 10 has a frame and wall structure similar to that described for the strips 13 and 14. Thus pad 10 is composed of a multiplicity of polygonal rod-like frames 10F oriented in different planes with membranous webs 10W severally sourrounded by some of such individual frames forming the walls of the pores.

The strips 13 and 14 may have adhesive applied to them before being joined together in any suitable manner. While a deeper portion 26 of large pore strip 13 is shown coated with adhesive than the portion 28 for adjacent strip 14, this is not essential. The effect, however, of the two coated portions 26 and 28 is to provide a band 30 which is adjacent a band 31 on one side forming an intermediate section or region of strip 13 uncoated with adhesive, and on the other side by a band 32 which is a central region of adjacent strip 14. The portions or regions 31 and 32 being uncoated with adhesive retain their original resilience, whereas the intermediate portion 30 is rigidified by the adhesive coating to provide a relatively stiff region which extends along the corresponding joint 29 having some extent laterally of each side of this joint.

The exposed sides of the bands 30–31 provide a working or scrubbing face represented by the numeral 33 which includes relatively abrasive sections 33A alternating with less abrasive surface sections 33B. The adhesive which provides the coating 25 may be of any suitable composition, such as a polyurethane prepolymer. Likewise, it may be applied in any suitable manner to the opposing cratered surfaces of adjacent strips 13 and 14 which when joined together provide the laminating joint 29.

Preferably, the laminated layers 11 and 12 are formed by first subjecting the opposing faces of adjacent strips which are to be joined to a very fine mist of a polyester base adhesive. This provides a very thin coating on the edges of the craters of the surface pores or cells which form the borders of adjacent strips and then the strips are brought together. When this adhesive cures a rigidified coating 25 is provided which has the effect of stiffening the portions of the pore structure of the polyurethane sponge coated.

After laminated layers 11 and 12 are formed they are severally adhesively attached to pad 10. The adhesive for this purpose and the technique employed may be the same as that just described for forming the layers 11 and 12 individually. Thus, the opposing faces of pad 10 and layers 11 and 12 may be sprayed with a polyester base adhesive and then united. The adhesive coating along joint 16 is represented by the numeral 35 in FIG. 3.

After formation of the scrubber by joining together the various sponge portions 10, 11 and 12 as described, it is preferred to impregnate the pad portion with a suitable cleaning preparation such as soap or detergent. If a surgical scrubber is to be provided such cleaning preparation contains any suitable antibacterial agent such as hexachlorophene, for example.

If such an impregnated surgical scrubber is provided, the user grasps the same in one hand, wets it with water squeezes it to foam up the cleaning preparation which works to the outer surfaces of the scrubber and scrubs the skin surface to be sterilized, pressing usually either the upper or lower outer working face of layer 11 or 12 against the skin. The scrubber may be held by turning back the portions 23U and 24U, or 23L and 24L, upon each other, to provide a handle which may be grasped, as depicted in FIG. 2.

The alternating and contrastingly abrasive band sections 33A and 33B provide a highly effective scrubbing surface. If an area of the skin is sensitive the surfaces 23S or 24S on opposite sides of the slits 23 or 24, respectively, may be used as the working face by being pressed against the skin area.

What is claimed is:

1. A scrubber comprising a polyurethane sponge pad having intercommunicating open pores individually defined by differently oriented and interconnected frames across some of which walls extend, and a laminated layer on at least one side of said pad including a plurality of alternating strips of polyurethane sponge severally having intercommunicating open pores individually defined by differently oriented and interconnected frames across some of which walls extend and joined together by adhesive coating not only elements of the frames and walls immediately at the opposing borders of adjacent strips to provide a laminating joint therebetween but also coating elements of the frames and walls of such strips laterally of the plane of said joint but not for the full width of any of such adjacent strips, the planes of the plurality of such laminating joints so provided outstanding from said side, such adhesive rigidifying the coated portions of said strips to provide relatively stiff bands which extend along said joints and alternate with more resilient uncoated portions of said strips, the exposed sides of such bands and uncoated portions providing a working face for the scrubber.

2. A scrubber according to claim 1 wherein said alternating strips have two different pore sizes one of which falls in the range of from 15 to 35 pores per lineal inch and the other falls in the range of from 20 to 45 pores per lineal inch.

3. A scrubber according to claim 1 wherein said alternating strips have two different pore sizes one of which is nominally 20 pores per lineal inch and the other is nominally 30 pores per lineal inch.

4. A scrubber according to claim 3 wherein the pore size of said pad is nominally 30 pores per lineal inch.

5. A scrubber according to claim 1 wherein said laminated layer is adhesively bonded to said one side of said pad without blocking communication between the open pores of said layer and pad.

6. A scrubber according to claim 1 wherein said pad is impregnated with a cleaning preparation containing an antibacterial agent.

7. A scrubber according to claim 1 wherein said pad is partially slit from opposite sides and in a plane generally parallel to said working face.

8. A scrubber according to claim 1 wherein said pad is in the shape of a flat sided block, said laminated layer is on one flat side of said pad and covers the full area thereof, a second similar laminated layer is on the opposite flat side of said pad, and the thickness of said pad is at least twice the sum of the thicknesses of such layers.

9. A scrubber according to claim 8 wherein said flat sides are generally rectangular, said laminating joints extend diagonally of said flat sides, the alternating strips in each of the laminated layers severally are substantially square in cross section as determined in a plane generally perpendicular to said joints, the pore size of said pad is nominally 30 pores per lineal inch, the alternating strips in each of said laminated layers have two different pore sizes one of which is nominally 20 pores per lineal inch and the other is nominally 30 pores per lineal inch, and each of said laminated layers is adhesively bonded to the correspondingly side of said pad without blocking communication between the open pores of said pad and layers.

10. A scrubber according to claim 9 wherein the flat sides of said pad are generally parallel, said pad is partially slit generally centrally from one pair of opposite sides along planes generally parallel to said flat sides, and said pad is impregnated with a cleaning preparation containing an antibacterial agent.

References Cited

UNITED STATES PATENTS

| | | | |
|---|---|---|---|
| 570,797 | 11/1896 | Gregory | 15—223 |
| 2,313,563 | 3/1943 | Mandalou | 15—244(B) |
| 3,005,219 | 10/1961 | Miller | 15—118X |
| 3,396,419 | 8/1968 | Richter et al. | 15—104.93 |

FOREIGN PATENTS

| | | | |
|---|---|---|---|
| 1,434,159 | 2/1966 | France | 15—244 |

DANIEL BLUM, Primary Examiner

U.S. Cl. X.R.

15—118, 223, 244